(12) United States Patent
Jang et al.

(10) Patent No.: US 8,482,485 B2
(45) Date of Patent: Jul. 9, 2013

(54) BARRIER DEVICE AND ELECTRONIC DISPLAY DEVICE

(75) Inventors: Hyoung-Wook Jang, Suwon-si (KR); Hui Nam, Suwon-si (KR); Beom-Shik Kim, Suwon-si (KR); Ja-Seung Ku, Suwon-si (KR); Chan-Young Park, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1170 days.

(21) Appl. No.: 12/255,091

(22) Filed: Oct. 21, 2008

(65) Prior Publication Data

US 2009/0103177 A1 Apr. 23, 2009

(30) Foreign Application Priority Data

Oct. 22, 2007 (KR) .................. 10-2007-0106315

(51) Int. Cl.
*G06F 3/038* (2006.01)

(52) U.S. Cl.
USPC ............ 345/6; 345/100; 345/204; 348/42; 348/51; 348/54; 349/15; 359/462

(58) Field of Classification Search
USPC .......... 345/87, 32, 51, 102, 204, 213; 348/51, 348/42, 54; 349/15; 359/462
See application file for complete search history.

(56) References Cited

U.S. PATENT DOCUMENTS

| 6,094,216 A * | 7/2000 | Taniguchi et al. ............ 348/51 |
| 2003/0067563 A1 | 4/2003 | Tomono |
| 2006/0197725 A1* | 9/2006 | Nam et al. .................. 345/87 |

FOREIGN PATENT DOCUMENTS

| CN | 1784022 | 6/2006 |
| CN | 1828364 A | 9/2006 |
| DE | 10241976 | 3/2003 |
| EP | 1650983 | 4/2006 |
| EP | 1827032 | 8/2007 |
| JP | 09-138370 A | 5/1997 |
| JP | 10-142572 | 5/1998 |
| JP | 2006-243710 A | 9/2006 |
| KR | 10-1999-0085280 | 12/1999 |
| KR | 10-2006-0034432 | 4/2006 |
| KR | 10-2006-0135450 | 12/2006 |
| KR | 10-2008-0000917 | 1/2008 |
| WO | WO 2006/004342 A1 | 1/2006 |

* cited by examiner

*Primary Examiner* — Amare Mengistu
*Assistant Examiner* — Joseph G Rodriguez
(74) *Attorney, Agent, or Firm* — Lee & Morse, P.C.

(57) ABSTRACT

A barrier device and a display device including the barrier device, include a plurality of column barrier electrodes and a plurality of row barrier electrodes. In the barrier unit, the column barrier electrodes are divided as a plurality of first column barrier electrodes and a plurality of second column barrier electrodes. Crossing regions of the first column barrier electrode and the plurality of row barrier electrodes are different from crossing regions of the second column barrier electrode and the plurality of row barrier electrodes. The barrier device improves image quality of stereoscopic images displayed by the display device.

20 Claims, 15 Drawing Sheets

FIG. 4B
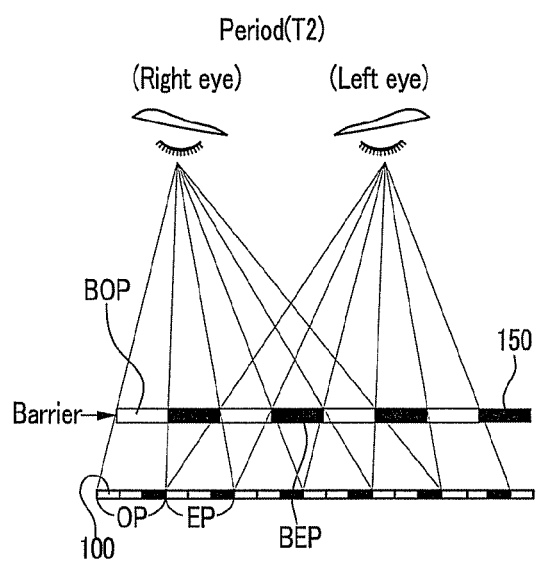
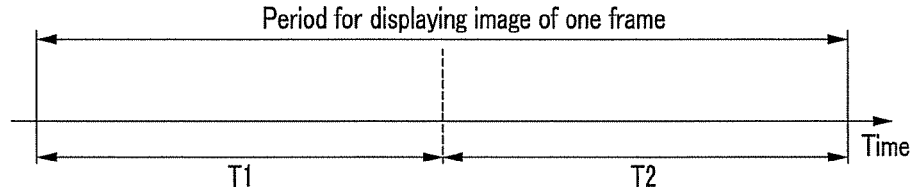

BARRIER DEVICE AND ELECTRONIC DISPLAY DEVICE

CROSS-REFERENCE TO RELATED APPLICATIONS

This application claims the benefit of Korean Patent Application No. 2007-106315 filed in the Korean Intellectual Property Office on Oct. 22, 2007, the contents of which are incorporated herein by reference.

BACKGROUND OF THE INVENTION

1. Field of the Invention

Aspects of the present invention relate to an electronic display device, and more particularly, to a barrier device to form a stereoscopic image and an electronic display device including the barrier device to form the stereoscopic image.

2. Description of the Related Art

In general, humans sense a stereoscopic effect based on physiological and experiential factors, and three-dimensional image displaying technologies express a stereoscopic effect of an object by using binocular parallax, which is a key factor for allowing humans to recognize a stereoscopic effect at a short distance. An electronic imaging device that displays stereoscopic images uses a method in which left and right images are spatially separated by using an optical element so that a stereoscopic image can be seen. Typical methods include a method using a lenticular lens array and a method using a parallax barrier.

Since an image is separated as an image seen by a left eye (hereinafter referred to as a "left-eye image") and an image seen by a right eye (hereinafter, a "right-eye image") to display the stereoscopic image, resolution of the stereoscopic image is reduced to half. To solve such problem, a driving method is used in which a stereoscopic image formed by combining the left-eye image and the right-eye image is displayed at a frequency that is more than double the frequency used to display a plane image,. i.e., a nonstereoscopic image. The stereoscopic image will now be described with reference to FIG. 1A, FIG. 1B, and FIG. 1C.

FIG. 1A is a diagram representing a left-eye image and a right-eye image of one frame. Respective screens L and R are vertically divided into eight regions. The screen is divided into the eight regions for better understanding and ease of description, but it is not limited thereto, and the screen may be divided into a number corresponding to pixels positioned in one column of a display unit of the electronic display device.

FIG. 1B is a diagram representing a stereoscopic image LR formed by combining the left-eye image and the right-eye image shown in FIG. 1A from the left-eye image to the right-eye image (hereinafter referred to as a "left-right image LR"). As shown in FIG. 1B, the left-right image LR includes odd-numbered columns L1, L3, L5, and L7 of the left-eye image of the screen L interposed with the even-numbered columns R2, R4, R6, and R8 of the right-eye image of the screen R. FIG. 1C is a diagram representing a stereoscopic image RL formed by combining the left-eye image and the right-eye image shown in FIG. 1A from the right-eye image to the left-eye image (hereinafter referred to as a "right-left image RL"). As shown in FIG. 1C, the right-left image RL includes even-numbered columns L2, L4, L6, and L8 of the left-eye image of the screen L interposed with the odd-numbered columns R1, R3, R5, and R7 of the right-eye image of the screen R.

The electronic display device displays the left-right image LR and the right-left image RL with a high driving frequency to display the stereoscopic image, and therefore image quality deterioration is decreased. However, portions of the left-right image LR and the right-left image RL are mixed in one frame, so the image quality remains deteriorated.

The above information disclosed in this Background section is only for enhancement of understanding of the background of the invention, and therefore, it may contain information that does not form the prior art that is already known in this country to a person of ordinary skill in the art.

SUMMARY OF THE INVENTION

Aspects of the present invention have been made in an effort to provide a barrier device to improve image quality of a stereoscopic image, and an electronic display device including the barrier device.

According to aspects of the present invention, an electronic display device to display a stereoscopic image includes a display unit and a barrier unit. According to aspects of the present invention, the display unit includes a plurality of scan lines to transmit a plurality of selection signals, a plurality of data lines to transmit a plurality of data signals formed according to input signals, and a plurality of pixels connected to the scan and data lines. According to aspects of the present invention, the barrier unit includes a plurality of column barrier electrodes respectively corresponding to the plurality of data lines, and a plurality of row barrier electrodes corresponding to at least one of the plurality of scan lines. According to aspects of the present invention, the column barrier electrodes are divided as a plurality of first column barrier electrodes arranged with predetermined intervals therebetween and a plurality of second column barrier electrodes respectively corresponding to the plurality of first column barrier electrodes, and crossing regions of the first column barrier electrode and the plurality of row barrier electrodes are different from crossing regions of the second column barrier electrode and the plurality of row barrier electrodes. According to aspects of the present invention, the plurality of first and second column barrier electrodes are respectively formed parallel to the data lines, and the plurality of row barrier electrodes are respectively formed parallel to the scan lines.

According to aspects of the present invention, a voltage applied to the first column barrier electrodes is different from a voltage applied to the second column barrier electrodes. According to aspects of the present invention, a barrier scan signal having a first level is applied to the row barrier electrode corresponding to a first scan line in synchronization with a time at which the selection signal is applied to the first scan line among the plurality of scan lines. According to aspects of the present invention, the electronic display device includes a barrier driver to apply a barrier scan signal having a first level to the row barrier electrode in synchronization with the selection signal applied to the scan line, and the plurality of row barrier electrodes respectively correspond to the plurality of scan lines. According to aspects of the present invention, the electronic display device may include a barrier driver to apply a barrier scan signal of a first level to the row barrier electrode in synchronization with a time at which the selection signal is applied to one of the at least two scan lines, and the plurality of row barrier electrodes respectively correspond to at least two of the plurality of scan lines.

According to aspects of the present invention, the barrier driver may apply the barrier scan signal of the first level to the row barrier electrode in synchronization with a time at which the selection signal is first applied to the at least two scan lines, may apply the barrier scan signal to the row barrier electrode in synchronization with a time at which the selection signal is finally applied to the at least two scan lines, or may apply the barrier scan signal of the first level to the row barrier electrode at a predetermined time between the time for first applying the selection signal to the at least two scan lines and the time for finally applying the selection signal to the at least two scan lines. According to aspects of the present invention, a voltage of the first level and a voltage of a second level are respectively applied to the first column barrier electrodes and the second column barrier electrodes, crossing regions of the first and second column barrier electrodes and the corresponding row barrier electrode become transmission regions when voltage differences between first and second column barrier electrodes and the corresponding row barrier electrode are greater than a predetermined threshold voltage, and the barrier driver applies a voltage of a third level to the row barrier electrode from a time at which the selection signal is first applied to the at least two scan lines until a time at which the selection signal is finally applied to the at least two scan lines. According to aspects of the present invention, a voltage difference between the first level and the third level and a voltage difference between the second level and the third level may be less than the threshold voltage.

According to aspects of the present invention, the input signal includes first image information corresponding to a first viewing point and second image information corresponding to a second viewing point, and the electronic display device further combines the first image information and the second image information to generate first image data and second image data. According to aspects of the present invention, the electronic display device further includes a barrier driver for sequentially applying a plurality of barrier scan signals respectively having a first level to the plurality of row barrier electrodes in synchronization with the selection signal during a first period to display the first image data on the display unit. According to aspects of the present invention, the barrier driver sequentially changes levels of the plurality of barrier scan signals respectively applied to the plurality of row barrier electrodes to be a second level in synchronization with the selection signal during a second period to display the second image data after the first period. According to aspects of the present invention, the first image information is left-eye image information, the second image information is right-eye image information, the first image data is generated by alternately combining first portions of the first image information with second portions of the second image information, and the second image data is generated by alternately combining first portions of the second image information with second portions of the first image information. According to aspects of the present invention, voltages of third and fourth levels are respectively applied to the first and second column barrier electrodes. According to aspects of the present invention, a voltage difference between the first and third levels is greater than a predetermined threshold voltage, and a voltage difference between the second and fourth levels is greater than the predetermined threshold voltage. According to aspects of the present invention, a sum of the first and second periods is included in a period to display an image of one frame.

According to an exemplary embodiment of the present invention, a barrier device includes a plurality of first barrier electrodes formed in a column direction and a plurality of second barrier electrodes formed in a row direction. According to aspects of the present invention, the plurality of second barrier electrodes respectively cross one of the plurality of first barrier electrodes, the plurality of first barrier electrodes respectively cross one of the plurality of second barrier electrodes, and an area in which a voltage difference between the first barrier electrode and the second barrier electrode is greater than a predetermined threshold voltage has a transmission state that is different from an area in which a voltage difference between the first barrier electrode and the second barrier electrode is less than the threshold voltage. According to aspects of the present invention, the plurality of first barrier electrodes are divided as first column barrier electrodes to which a voltage of a first level is applied and second column barrier electrodes to which a voltage of a second level is applied, and the barrier device further includes a barrier driver to sequentially apply a plurality of barrier scan signals alternately having voltages of third and fourth levels to the plurality of second barrier electrodes. According to aspects of the present invention, a voltage difference between the voltage of the third level and the voltage of the first level is greater than the threshold voltage, and a voltage difference between the voltage of the second level and the voltage of the fourth level is greater than the threshold voltage. According to aspects of the present invention, the first column barrier electrode and the second column barrier electrode are alternately formed.

According to the exemplary embodiment of the present invention, a barrier device for providing a stereoscopic image having improved image quality by preventing the left-right image and the right-left image from being mixed and an electronic display device including the barrier device are provided.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A and 4B are diagrams representing a driving method of the electronic display device according to the exemplary embodiment of the present invention;

DETAILED DESCRIPTION OF THE EMBODIMENTS

Figure 1A:
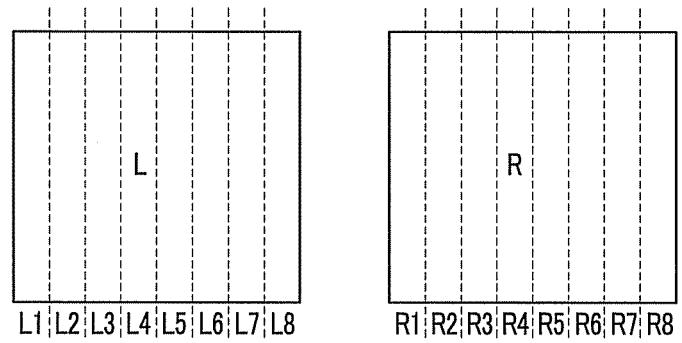
FIG. 1A is a diagram representing a left-eye image and a right-eye image of one frame.
Figure 1B:
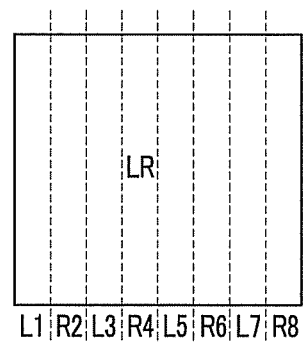
FIG. 1B is a diagram representing a stereoscopic image LR formed by combining the left-eye image and the right-eye image shown in FIG. 1A from the left-eye image to the right-eye image.
Figure 1C:
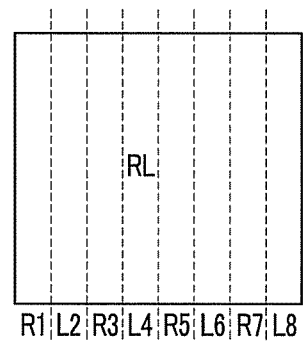
FIG. 1C is a diagram representing a stereoscopic image RL formed by combining the left-eye image and the right-eye image shown in FIG. 1A from the right-eye image to the left-eye image.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures.

Aspects of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "connected" to the other element through a third element. Further, such connections may be electrical or mechanical but are not limited thereto. In addition, unless explicitly described to the contrary, the word "comprise" and variations such as "comprises" or "comprising" will be understood to imply the inclusion of stated elements but not the exclusion of any other elements.

Figure 2:
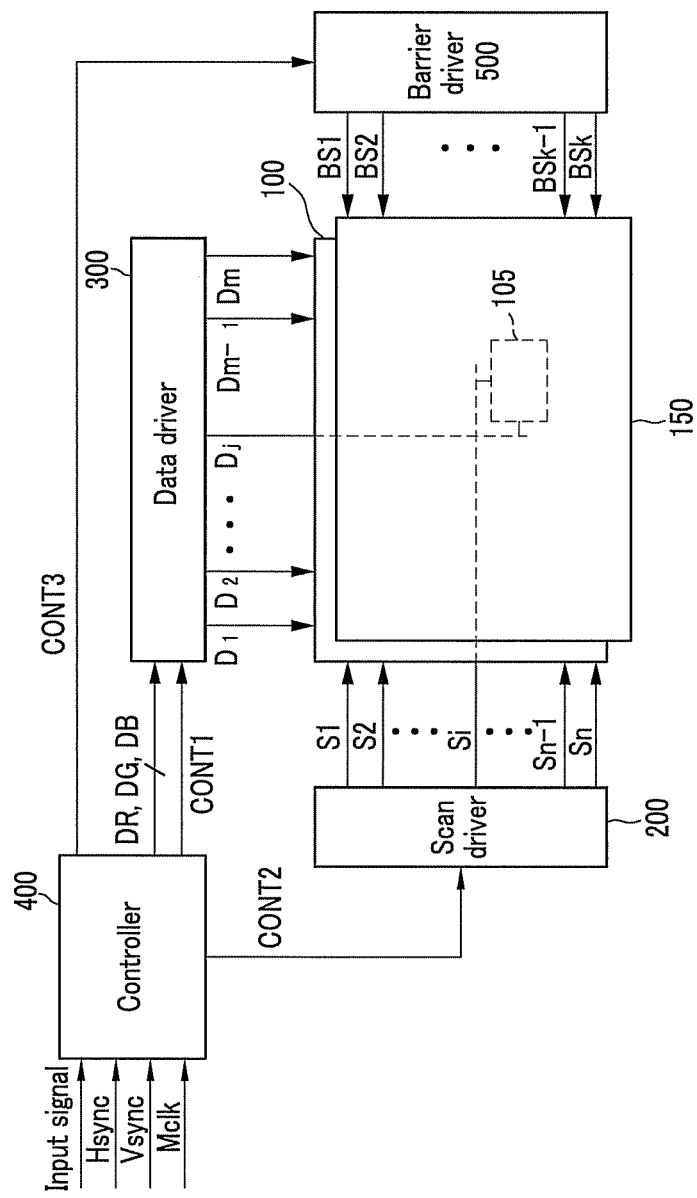
FIG. 2 is a diagram of an electronic display device according to an exemplary embodiment of the present invention.

An electronic display device according to an exemplary embodiment of the present invention and a driving method thereof will now be described. FIG. 2 is a diagram of an electronic display device according to an exemplary embodiment of the present invention. As shown in FIG. 2, the electronic display device according to the exemplary embodiment of the present invention includes a display unit 100, a barrier unit 150, a scan driver 200, a data driver 300, a controller 400, and a barrier driver 500. According to aspects of the present invention, the electronic display device displays static or dynamic stereoscopic images.

The display unit 100 includes a plurality of scan lines S1~Sn that transfer selection signals to a plurality of pixels 105, a plurality of data lines D1~Dm that are formed to be insulated from and formed to cross the plurality of scan lines S1~Sn and that transfer data signals to the plurality of pixels 105. The plurality of pixels 105 are formed on at least one crossing region among crossing regions of the scan lines S1~Sn and the data lines D1~Dm. In the present exemplary embodiment, it is assumed that a red sub-pixel that displays red (R), a green sub-pixel that displays green (G), and a blue sub-pixel that displays blue (B) form a single pixel. Also, in the present exemplary embodiment, the plurality of pixels 105 of the display unit 100 are divided into pixels corresponding to a left-eye image (referred to as "left-eye pixels", hereinafter), and pixels corresponding to a right-eye image (referred to as "right-eye pixels", hereinafter). The left-eye pixels and the right eye pixels are formed to be repeatedly arranged. In more detail, the left-eye pixels and the right eye-pixels may be repeatedly arranged in parallel with each other to have a stripe pattern or may be arranged in a zigzag pattern. The left-eye pixels and the right-eye pixels can be suitably changed according to a structure of the barrier unit 150. The pixels 105 of the display unit 100 according to the present exemplary embodiment include an organic light emitting element (i.e., an organic light emitting diode) and a pixel circuit to drive the organic light emitting element. However, aspects of the present invention are not limited to the organic light emitting element such that the display unit 100 may be a liquid crystal display device, cathode ray tube, light emitting diode, or other display device.

The scan driver 200 is connected with the scan lines S1~Sn of the display unit 100 and applies selection signals formed of a combination of a gate ON voltage and a gate OFF voltage to the scan lines S1~Sn. The scan driver 200 may apply the selection signals to the plurality of scan lines S1~Sn such that the selection signals sequentially have the gate ON voltage. When the selection signals have the gate ON voltage, the switching transistor of a pixel circuit connected with a corresponding one of the scan lines S1~Sn is turned ON.

The data driver 300 is connected with the data lines D1~Dm of the display unit 100 and applies data signals respectively representing a gray scale to the data lines D1~Dm. The data driver 300 converts input image data DR, DG, and DB, which are input from the controller 400 and have a gray scale value, into data signals in the form of voltage or current.

The controller 400 receives an input signal IS, a horizontal synchronization signal Hsync, and a vertical synchronization signal Vsync from the outside, generates a data control signal CONT1, image data signals DR, DG, and DB, a scan control signal CONT2, and a barrier driver control signal CONT3. The controller 400 applies the scan control signal CONT2 to the scan driver 200. The controller 400 applies the data control signal CONT1 and the image data signals DR, DG, and DB to the data driver 300. The controller 400 applies the barrier driver control signal CONT3 to the barrier driver 500.

The scan control signal CONT2 includes a scan start signal indicating the start of scanning and a first clock signal. In the present exemplary embodiment, the scan start signal controls a point of time at which an image of a single frame starts to be displayed on the display unit in synchronization with the vertical synchronization signal Vsync indicating the start of transferring of image data of the single frame. The first clock signal is a signal that controls a point of time at which selection signals are transferred to each of the plurality of scan lines S1~Sn in synchronization with the horizontal synchronization signal Hsync indicating transferring of the input image data with respect to pixels of a single row. The data signal control CONT1 includes a second clock signal having a certain period in synchronization with the horizontal synchronization signal Hsync and a horizontal synchronization start signal that controls the start of the transfer of the data signal. The first clock signal and the second clock signal of the electronic display device according to the exemplary embodiment of the present invention may have frequencies that are double the input horizontal synchronization signal to display a left-right image LR and a right-left image RL during one frame period. In addition, when the input image data corresponding to one row is transmitted to the data driver 300, the controller 400 may transmit the input image data DR, DG, and DB through three channels for respective colors or may sequentially transmit the input image data DR, DG, and DB through one channel.

Here, the input signal IS input to the controller 400 comprises 3D graphic data that includes three dimensional space coordinate information and surface information of an object to be stereoscopically displayed on a plane, or the input signal IS input to the controller 400 comprises stereoscopic image data including respective viewing point image data, such as first image information corresponding to a first viewing point and second image information corresponding to a second viewing point. The controller 400 generates a barrier driver control signal CONT3 to drive the barrier unit according to the selection signal transmitted to the plurality of scan lines S1~Sn. The barrier driver control signal CONT3 includes a barrier driving start signal indicating the start of one frame according to the vertical synchronization signal Vsync and a third clock signal. The third clock signal has a frequency for controlling an operating time of a plurality of barrier electrodes, as described below, of the barrier unit 150. When the barrier electrodes formed in a row direction among the plurality of barrier electrodes of the barrier unit 150 respectively correspond to the plurality of scan lines S1~Sn, the third clock signal may have the same frequency as the first clock signal. However, when one of the barrier electrodes formed in the row direction corresponds to at least two scan lines S1 Sn or when at least two of the barrier electrodes form in the row direction corresponds to one of the scan lines S1~Sn, (i.e., ken), the third clock signal may have a frequency different from the first clock signal.

The barrier driver 500 controls an operation of the barrier unit 150 according to the barrier driver control signal CONT3. In further detail, the barrier driver 500 generates barrier scan signals BS1-BSk applied to the barrier electrodes (described below) of the barrier unit 150. The barrier unit 150 operates according to the plurality of barrier scan signals BS1-BSk applied to the barrier electrodes, which will be described later in detail.

Figure 3:
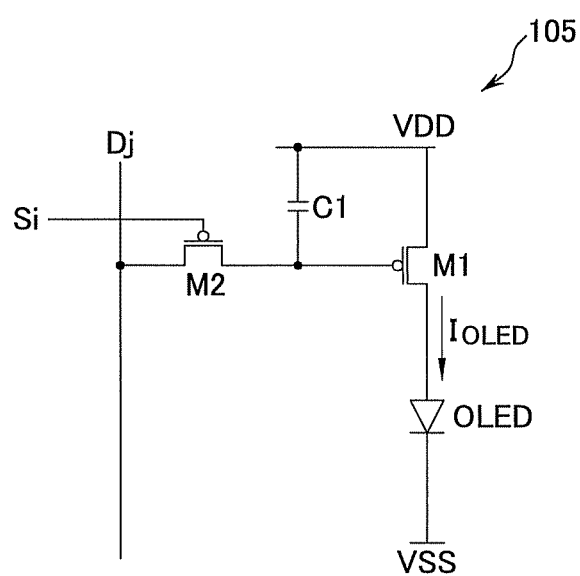
FIG. 3 is a diagram of a pixel according to the exemplary embodiment of the present invention.

FIG. 3 is a diagram of the pixel according to the exemplary embodiment of the present invention. The pixel according to the exemplary embodiment of the present invention includes a driving transistor M1, a switching transistor M2, a capacitive element C1, and an organic light emitting diode (OLED). The OLED has a diode characteristic, and includes an anode, an organic thin film, and a cathode.

The pixel 105 is positioned at a crossing region of one scan line Si of the plurality of scan lines S1~Sn and one data line Dj of the plurality of data lines D1~Dm, and is connected to the scan line Si and the data line Dj. The driving transistor M1 generates a driving current in response to a voltage applied to a gate electrode and a source electrode of the driving transistor M1. The switching transistor M2 is turned ON in response to a selection signal transferred from the scan line Si to a gate electrode of the switching transistor M2. The capacitive element C1 is connected between the gate electrode and the source electrode of the driving transistor M1 and uniformly maintains a voltage difference between a power source voltage VDD and the data signal applied to the data line Dm as applied to the capacitive element C1 when the switching transistor M2 is turned ON. Thereby, the driving transistor M1 generates a driving current IOLED corresponding to a difference between the voltage of the data signal applied to the data line Dm transferred to the gate electrode of the driving transistor M1 and the power source voltage VDD applied to the source electrode of the driving transistor M1. The generated driving current IOLED flows to the OLED through a drain electrode of the driving transistor M1. The OLED is connected between the drain electrode of the driving transistor M1 and a ground VSS. The OLED emits light corresponding to the driving current IOLED. The light emitting element of the electronic display device according to the exemplary embodiment of the present invention is not limited to the organic light emitting diode, and a liquid crystal element including a backlight or other display device may be used.

Figure 4A:
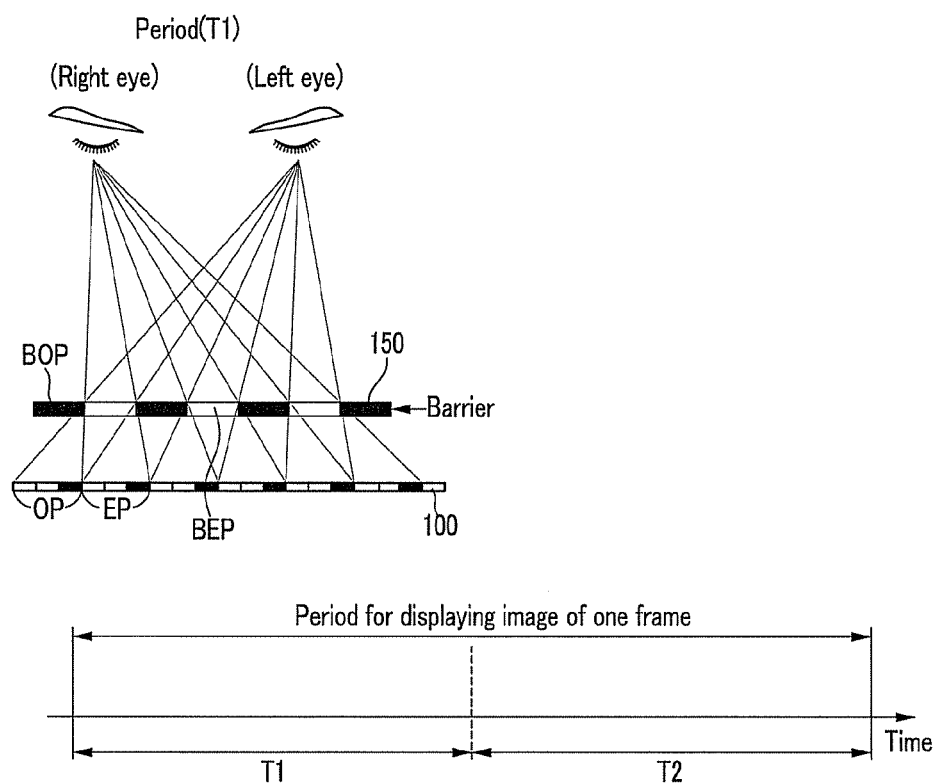

A driving method of the electronic display device according to the exemplary embodiment of the present invention will be described with reference to FIGS. 4A and 4B. FIGS. 4A and 4B are diagrams representing the driving method of the electronic display device according to the exemplary embodiment of the present invention. The electronic display device according to the exemplary embodiment of the present invention is driven by a time-division method.

The time division driving method may include: 1) a method in which a light source is alternately operated at left and right sides, and the left and right sides are divided according to a time division by using an optical element including a combination of a prism and a lenticular lens; or 2) a method in which a slit in a liquid crystal barrier through which light passes is divided into several sections and the sections are moved in synchronization with a displayed image. The electronic imaging device according to the exemplary embodiment of the present invention is driven according to the second method but not limited thereto. FIGS. 4A and 4B show the basic case for one viewer having two eyes, but aspects of the present invention are not limited thereto, and the same principle can be applied for the case of multiple viewers.

FIG. 4A shows that a left-right image LR is seen by a user in a first period T1 when one frame is divided into two periods including first and second periods T1 and T2 according to the time division method. FIG. 4B shows that the right-left image RL is seen by the user in the second period T2.

In the first period T1, an odd pixel OP of the display unit 100 is a left-eye pixel and an even pixel EP is a right-eye pixel. In the first period T1, a barrier odd pixel BOP of the barrier unit 150 is a non-transmission region and a barrier even pixel BEP of the barrier unit 150 is a transmission region. The non-transmission region of the barrier unit 150 optically blocks light, and the transmission region transmits the light. Thus, as shown in FIG. 4A, paths for transmitting the left-eye image to the left eye and transmitting the right-eye image to the right eye are formed. The left-eye image projected from the odd pixels OP is formed as an image having a certain disparity with respect to the right-eye image, and the right-eye image projected from the even pixels EP is formed as an image having a certain disparity with respect to the left-eye image. Accordingly, when the user recognizes the left-eye image projected from the odd pixels OP and the right-eye image projected from the even pixels EP with his/her left and right eyes, he/she obtains depth information as if he/she looked at an actual solid target through his/her left and right eyes, perceiving a stereoscopic effect.

In FIG. 4B illustrating the second period T2, an odd pixel OP of the display unit 100 is the right-eye pixel and an even pixel EP of the display unit 100 is the left-eye pixel. In the second period T2, the barrier odd pixel BOP of the barrier unit 150 is a transmission region and the barrier even pixel BEP of the barrier unit 150 is a non-transmission region. As shown in FIG. 4B, paths are formed through which a left-eye image is projected to a user's left eye and paths through which a right-eye image is projected to the user's right eye. The right-eye image projected from the odd pixels OP is formed as an image having a certain disparity with respect to the left-eye image, and the left-eye image projected from the even pixels EP is formed as an image having a certain disparity with respect to the right-eye image. Accordingly, when the user recognizes the right-eye image projected from the odd pixels OP and the left-eye image projected from the even pixels EP with his/her left and right eyes, he/she obtains depth information as if he/she looked at an actual solid target through his/her left and right eyes, perceiving a stereoscopic effect.

Therefore, during the first period T1, the odd pixels OP of the display unit 100 are seen by a user's left eye while the even pixels EP of the display unit 100 are seen by a user's right eye, and during the second period T2, the odd pixels OP of the display unit 100 are seen by a user's right eye while the even pixels EP of the display unit 100 are seen by a user's left eye. However, since the image is displayed along the scan direction in which the selection signal is transmitted to the plurality of scan lines S1~Sn, the left-right image LR and the right-left image RL may be mixed and displayed on the display unit 100 for a period during which the right-left image RL is written on the display unit 100 during the second period T2 after the left-right image LR is displayed during the first period T1. In a like manner, during a period during which the left-right image LR is written on the display unit 100 after the right-left image RL is displayed, the left-right image LR and the right-left image RL may be mixed and displayed on the display unit 100. To eliminate such mixing of images, the barrier unit 150 has a configuration shown in FIG. 5.

Figure 5:
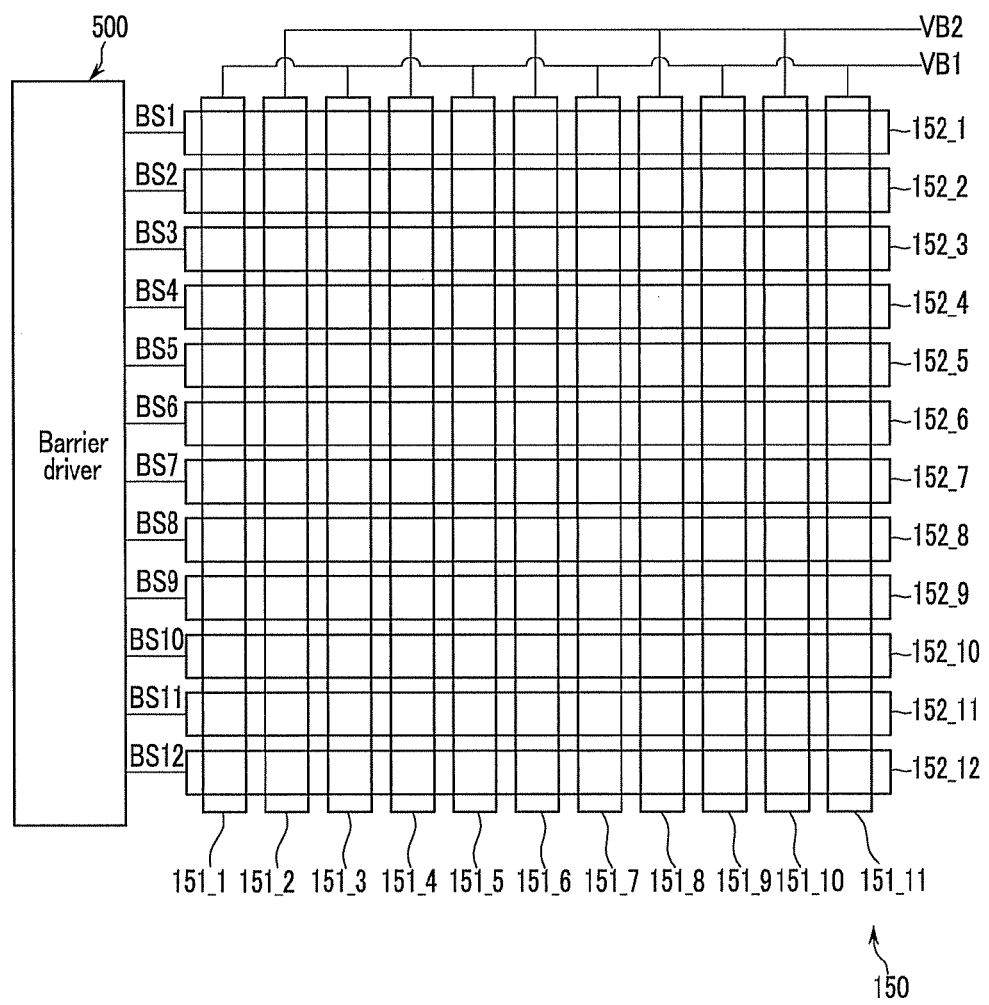
FIG. 5 is a diagram representing a barrier driver and a barrier unit according to the exemplary embodiment of the present invention.

FIG. 5 is a diagram representing the barrier driver 500 and the barrier unit 150 according to the exemplary embodiment of the present invention. In FIG. 5, for better understanding and ease of description, a plurality of column barrier electrodes 151_1 to 151_11 formed in a vertical direction of the barrier unit and a plurality of row barrier electrodes 152_1 to 152_12 formed in a horizontal direction are illustrated. As shown in FIG. 4, the barrier unit 150 includes the column barrier electrodes 151_1 to 151_11 corresponding to a number for alternately forming the non-transmission region and the transmission region with respect to the pixels of one row of the display unit 100. In addition, the barrier unit 150 includes the plurality of row barrier electrodes 152_1 to 152_12 such that one row barrier electrode corresponds to at least one row of the display unit 100.

Crossing regions, in which one of the column barrier electrodes 151_1 to 151_11 and one of the row barrier electrodes 152_1 to 152_12 intersect, become the non-transmission region or the transmission region according to a voltage difference between a voltage of the column barrier electrode 151_1 to 151_11 and a voltage of the row barrier electrode 152_1 to 152_12. In a default white mode, the crossing regions of the barrier unit 150 become the non-transmission regions when a voltage difference between the column barrier electrodes 151_1 to 151_11 and row barrier electrodes 152_1 to 152_12 is greater than a predetermined voltage, and the crossing regions of the barrier unit 150 become transmission regions. In addition, in a default black mode, when the voltage difference between the column barrier electrodes 151_1 to 151_11 and row barrier electrodes 152_1 to 152_12 is greater than the predetermined voltage, the crossing regions of the barrier unit 150 become the transmission regions, and the crossing regions of the barrier unit 150 become the non-transmission regions. A voltages VB1 is applied to the plurality of column barrier electrodes 151_1, 151_3, 151_5, 151_7, 151_9, and 151_11 (hereinafter referred to as a "first column barrier electrode group"), and a voltage VB2 is applied to the plurality of column barrier electrodes 151_2, 151_4, 151_6, 151_8, and 151_10 (hereinafter referred to as an "second column barrier electrode group"). The voltages VB1 and VB2 may have different levels. The barrier driver 500 respectively applies the plurality of barrier scan signals BS1-BS12 to the plurality of row barrier electrodes 152_1 to 152_12. Thus, a crossing region in which the voltage difference between one of the column barrier electrodes 151_1 to 151_11 and one of the row barrier electrodes 152_1 to 152_12 is greater than the predetermined voltage is separated from another crossing region to be formed as the non-transmission region or the transmission region. For better understanding and ease of description, the default white barrier unit 150 will be described, but the barrier unit 150 is not limited thereto.

Figure 6:
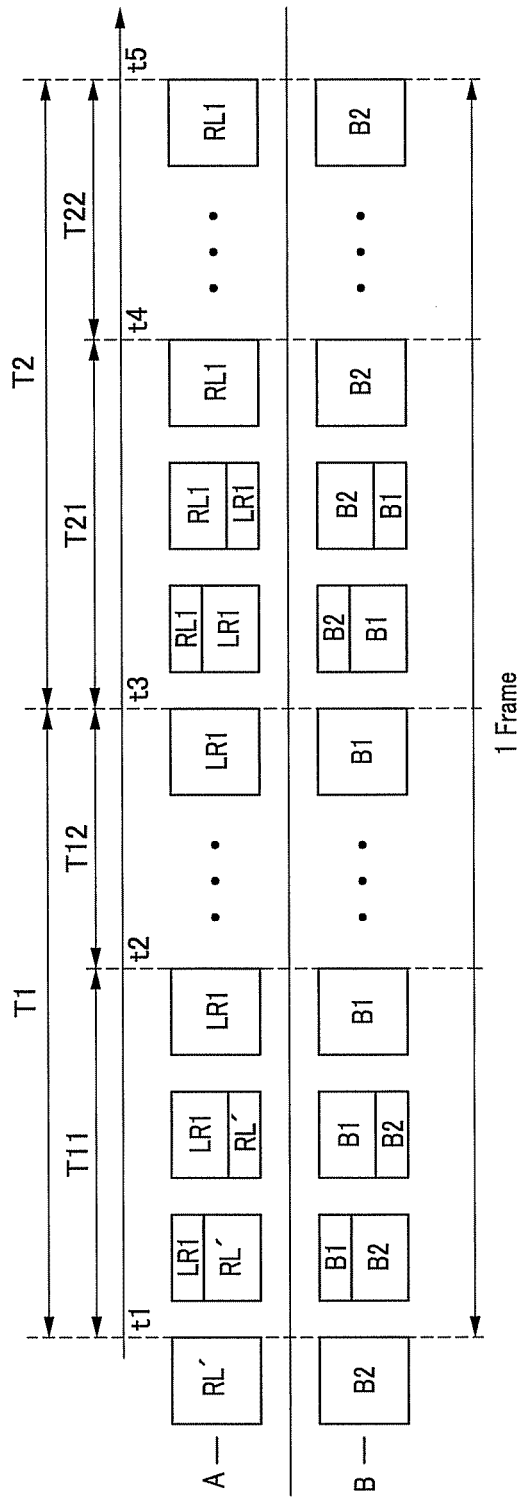
FIG. 6 is a diagram representing a display unit and the barrier unit while an image of the electronic display device according to the exemplary embodiment of the present invention is changed from the left-right image LR to the right-left image RL.

FIG. 6 is a diagram representing the display unit 100 and the barrier unit 150 when the image of the electronic display device according to the exemplary embodiment of the present invention is changed from the left-right image LR to the right-left image RL in first and second periods T1 and T2 of a single frame. An upper row A of FIG. 6 shows image changes of the display unit 100, and a lower row B shows barrier changes of the barrier unit 150. For better understanding and ease of description, a predetermined frame is illustrated in FIG. 6. The frame is divided into a first period T1 and a second period T2. The first period T1 includes a write period T11 of the left-right image LR and a sustain period T12 of the left-right image LR, and the second period T2 includes a write period T21 of the right-left image RL and a sustain period T22 of the right-left image RL. For example, as shown in FIGS. 4 through 6, in the barrier unit 150, the crossing regions of the first column barrier electrode group 151_1, 151_3, 151_5, 151_7, 151_9, and 151_11 and the plurality of row barrier electrodes 152_1 to 152_12 are the non-transmission regions so as to display the left-right image LR1 in the first period T1 (hereinafter, a "first barrier mode B1"). In addition, the crossing regions of the second column barrier electrode group 151_2, 151_4, 151_6, 151_8, and 151_10 and the plurality of row barrier electrodes 152_1 to 152_12 are the non-transmission regions so as to display the right-left image RL1 in the second period T2 as shown in FIGS. 4 through 6 (hereinafter, a "second barrier mode B2"). In the exemplary embodiment of the present invention, while the crossing regions of the first and second column barrier electrode groups and the plurality of row barrier electrodes 152_1 to 152_12 are the non-transmission regions so as to display the left-right image LR1 and the right-left image RL1, such display unit 100 and barrier unit 150 are not limited thereto.

The plurality of row barrier electrodes 152_1 to 152_12 are driven according to the barrier scan signals BS1-BS12 in synchronization with a time where the left-right image LR1 is written in the display unit 100 during the write period T11. For example, when the voltage VB1 is a voltage of 5V and the voltage VB2 is a ground voltage, the voltage of 5V is applied to the first column barrier electrode group 151_1, 151_3, 151_5, 151_7, 151_9, and 151_11, and the ground voltage is applied to the second column barrier electrode group 151_2, 151_4, 151_6, 151_8, and 151_10. When the barrier scan signals BS1-BS12 are respectively reduced to a voltage less than the predetermined voltage, the voltage difference at the crossing regions of the plurality of row barrier electrodes 152_1 to 152_12 and the first column barrier electrode group 151_1, 151_3, 151_5, 151_7, 151_9, and 151_11 is greater than a threshold voltage for allowing the barrier unit 150 to be the non-transmission regions, and the crossing regions become the non-transmission regions. The barrier scan signals BS1-BS12, according to the exemplary embodiment of the present invention, are respectively formed as a combination of a voltage for allowing the voltage difference of the row barrier electrodes 152_1 to 152_12 and the column barrier electrodes 151_1 to 151_11 to be greater than the threshold voltage and a voltage for not allowing the voltage difference of the row barrier electrodes 152_1 to 152_12 and the column barrier electrodes 151_1 to 151_11 to be greater than the threshold voltage. The threshold voltage may be established to be 5V.

Accordingly, to display according to the first barrier mode B1 of the barrier unit 150 so as to display the left-right image LR1 in the first period T1, the barrier scan signals BS1-BS12 are determined such that the barrier scan signals BS1-BS12 are lower than the ground voltage and the voltage difference of the second column barrier electrode group 151_2, 151_4, 151_6, 151_8, and 151_10 and the barrier scan signals BS1-BS12 is not greater than the threshold voltage such that the crossing regions of the second column barrier electrode group 151_2, 151_4, 151_6, 151_8, and 151_10 and the row barrier electrodes 152_1 to 152_12 are transmission regions. For example, when the barrier scan signals BS1-BS12 sequentially become the ground voltages in synchronization with the selection signal input to write the left-right image LR1 on the display unit 100, the crossing regions of the first column barrier electrode group 151_1, 151_3, 151_5, 151_7, 151_9, and 151_11 and the row barrier electrodes 152_1 to 152_12 become the non-transmission regions. Therefore, the barrier unit 150 in which the display area is the left-right image LR1 is driven in the first barrier mode B1. In addition, to write the right-left image RL1 during the second period T2, the voltage difference between the second column barrier electrode group 151_2, 1514, 151_6, 151_8, and 151_10 and the row barrier electrodes 152_1 to 152_12 is required to be greater than the threshold voltage. In this case, since the voltage difference between the barrier scan signals BS1-BS12 and the second column barrier electrode group 151 2, 151 4, 151 _6, 151 _8, and 151_10 is greater than the threshold voltage, the barrier scan signals BS1-BS12 are determined so that the voltage difference between the barrier scan signals BS1-BS12 and the first column barrier electrode group 151_1, 151_3, 151_5, 151_7, 151_9, and 151_11 is not greater than the threshold voltage. For example, when the barrier scan signals BS1-BS12 sequentially become the voltage of 5V in synchronization with the selection signal input to write the right-left image RL1 on the display unit 100 during the period T21, the crossing regions of the second column barrier electrode group 151_2, 151_4, 151_6, 151_8, and 151_10 and the plurality of row barrier electrodes 152_1 to 152_12 become the non-transmission regions. Thereby, the barrier unit 150 in which the display area of the display unit 100 becomes the right-left image RL1 is driven in the second barrier mode B2. For better understanding and ease of description, while it has been described that the barrier scan signals BS1-BS12 alternately have the ground voltage and the voltage of 5V, it is not limited thereto, and the barrier scan signals BS1-BS12 may have various voltages if the above conditions are satisfied.

In FIG. 6, a right-left image RL of a previous frame is displayed on the display unit 100, and the left-right image LR1 of a current frame (1 Frame) is started to be written from a time t1. Thereby, the barrier unit 150 is driven in the first barrier mode B1 by the area where the left-right image LR1 is displayed, and a remaining area is in the second barrier mode B2. When the left-right image LR1 continues to be written in a scan direction (a direction in which barrier scan signals are applied to the row barrier electrodes 152_1 to 152_12), the area driven in the first barrier mode B1 increases as the left-right image LR1 is written, and the area driven in the second barrier mode B2 decreases. The entire left-right image LR1 is written on the display unit 100 at the time t2, and the entire barrier unit 150 is driven in the first barrier mode B1. During the sustain period T12, the left-right image LR1 and the first barrier mode B1 are maintained. When the right-left image RL1 is started to be written at the time t3 in the scan direction, the barrier unit 150 applies the second barrier mode B2 by the area where the right-left image RL1 is displayed. The entire right-left image RL1 is written on the display unit 100 at the time t4, and the entire barrier unit 150 becomes the second barrier mode B2. During the sustain period T22, the right-left image RL1 and the second barrier mode B2 are maintained. By repeatedly performing the above processes, the electronic display device displays the stereoscopic image according to the exemplary embodiment of the present invention.

A method for driving the display unit 100 and the barrier unit 150 in the electronic display device according to the exemplary embodiment of the present invention while the display unit 100 and the barrier unit 150 are synchronized will now be described with reference to FIGS. 7 to 12.

Figure 7:
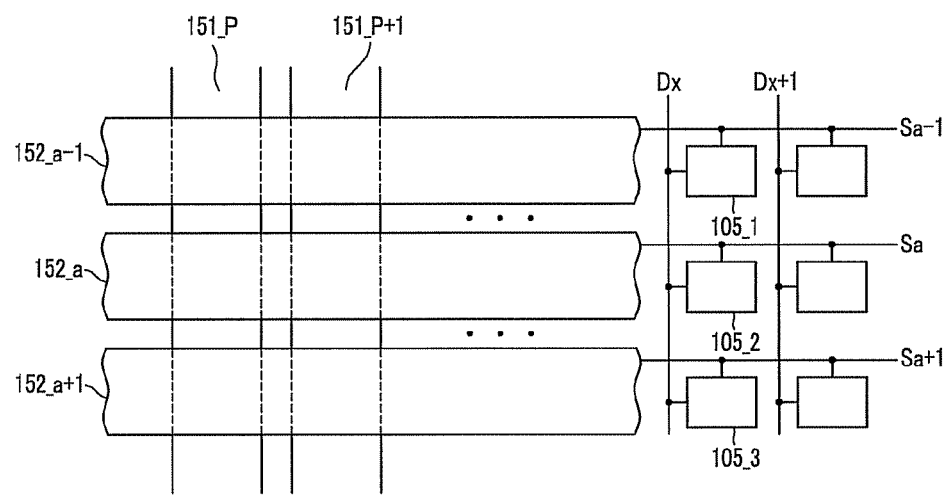
FIG. 7 is a diagram partially showing the display unit and the barrier unit of the electronic display device according to the exemplary embodiment of the present invention.

FIG. 7 is a diagram showing portions of the display unit 100 and the barrier unit 150 of the electronic display device according to the exemplary embodiment of the present invention. In FIG. 7, one row barrier electrode corresponds to one row formed by the plurality of pixels in a row direction in the display unit 100. Accordingly, the number of the plurality of row barrier electrodes of the barrier unit 150 is n, which is the same as that of the plurality of scan lines; however, aspects of the present invention are not limited thereto such that the number of row barrier electrodes may differ from the number of scan lines. For better understanding and ease of description, three scan lines Sa−1, Sa, and Sa+1 apply the selection signal to respective rows of the display unit 100, three row barrier electrodes 152_a−1, 152_a, and 152_a+1 respectively corresponding to the three scan lines Sa−1, Sa, and Sa+1, and two column barrier electrodes 151_p and 151_p+1 are shown. In FIG. 7, the column barrier electrodes 151_p and 151_p+1 and the row barrier electrodes 152_a−1, 152_a, and 152_a+1 are positioned on the display unit 100 in which the scan lines Sa−1, Sa, and Sa+1 the data lines Dx and Dx+1, and the pixels 105_1 are formed, and for better understanding and ease of description, some of the column barrier electrodes 151_p and 151_p+1 and row barrier electrodes 152_a−1, 152_a, and 152_a+1 are illustrated along with the display unit 100 positioned below. The column barrier electrodes 151_p and 151_p+1 and row barrier electrodes 152_a−1, 152_a, and 152_a+1 are respectively extended in vertical and horizontal directions to be positioned on the display unit 100. The column barrier electrode 151_p is one of the first column barrier electrode group, and the column barrier electrode 151_p+1 is one of the second column barrier electrode group.

Figure 8:
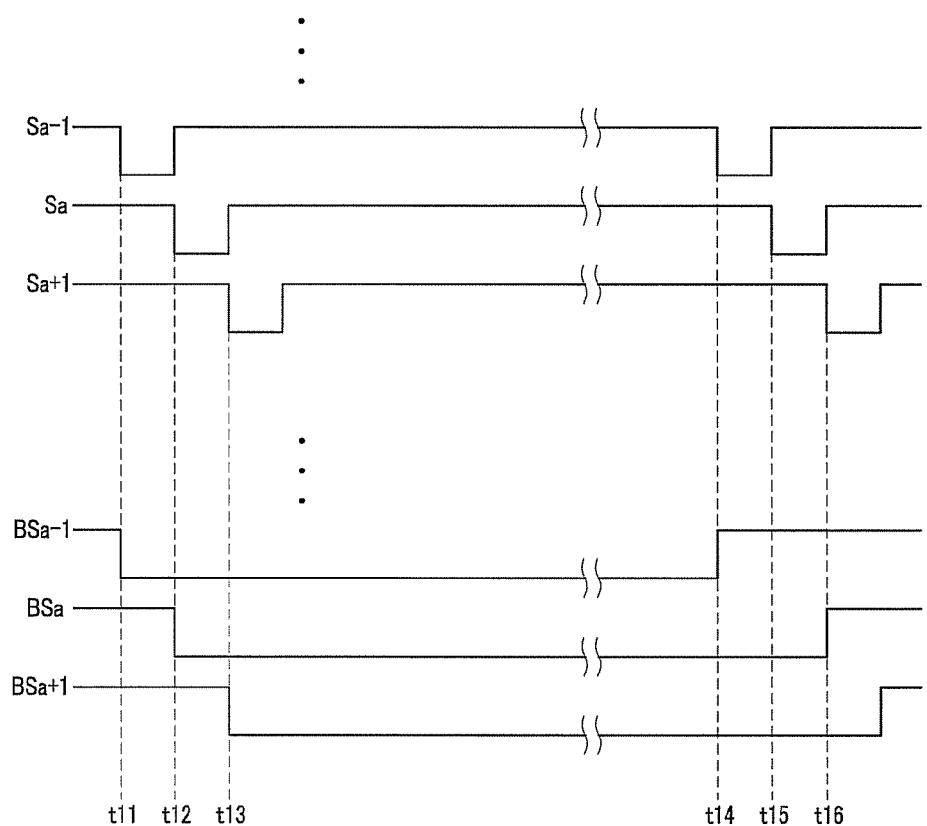
FIG. 8 is a diagram representing selection signals and barrier scan signals respectively applied to scan lines Sa−1, Sa, and Sa+1 and row barrier electrodes 152_a−1, 152_a, and 152_a+1.

FIG. 8 is a diagram representing the selection signals and the barrier scan signals respectively applied to the scan lines Sa−1, Sa, and Sa+1 and the row barrier electrodes 152_a−1, 152_*a*, and 152_*a*+1. When the selection signal of the scan line Sa−1 is a low level at the time t11, the pixels positioned on the same row as the pixel 105_1 of FIG. 7 emit light according to the data signal transmitted from the plurality of data lines Dx and Dx+1 of FIG. 7. A level of the barrier scan signal BSa−1 is changed from a high level to the low level, and the crossing region of the column barrier electrode 151_*p* of the first column barrier electrode group and the row barrier electrode 152_*a*−1 becomes the non-transmission region. In this case, the high level of the barrier scan signal according to the exemplary embodiment of the present invention is 5V, the low level is 0V, and the voltage of 5V is applied to the first column barrier electrode group.

Subsequently, when the selection signal of the scan line Sa is the low level at the time t12, the pixels positioned on the same row as the pixel 105_2 emit light according to the data signals transmitted from the plurality of data lines Dx and Dx+1. A level of the barrier scan signal BSa becomes the low level, and therefore the crossing region of the column barrier electrode 151_*p* of the first column barrier electrode group and the row barrier electrode 152_*a* becomes the non-transmission region. Then, when the selection signal of the scan line Sa+1 is the low level at the time t13, the pixels positioned on the same row as the pixel 105_3 emit light according to the data signals transmitted from the plurality of data lines Dx and Dx+1. A level of the barrier scan signal BSa+1 becomes the low level, and therefore the crossing region of the column barrier electrode 151_*p* of the first column barrier electrode group and the row barrier electrode 152_*a*+1 becomes the non-transmission region. The non-transmission region of the barrier unit 150 is sequentially changed in synchronization with a time where the selection signals are sequentially applied to the scan lines Sa−1, Sa, and Sa+1 so that the barrier unit 150 is driven in the first barrier mode B1 in the first period of the frame (1 Frame).

When the write period T21 (shown in FIG. 6) of the right-left image RL1 is started after the non-transmission region of the barrier unit is changed and the sustain period T12 (shown in FIG. 6) is finished, the levels of the barrier scan signals are changed from the low level to the high level in synchronization with times t14, t15, and t16 when the selection signals are respectively applied to the scan lines Sa−1, Sa, and Sa+1. Thereby, the non-transmission region of the barrier unit 150 is changed so that the barrier unit 150 is driven in the second barrier mode B2.

Figure 9A:
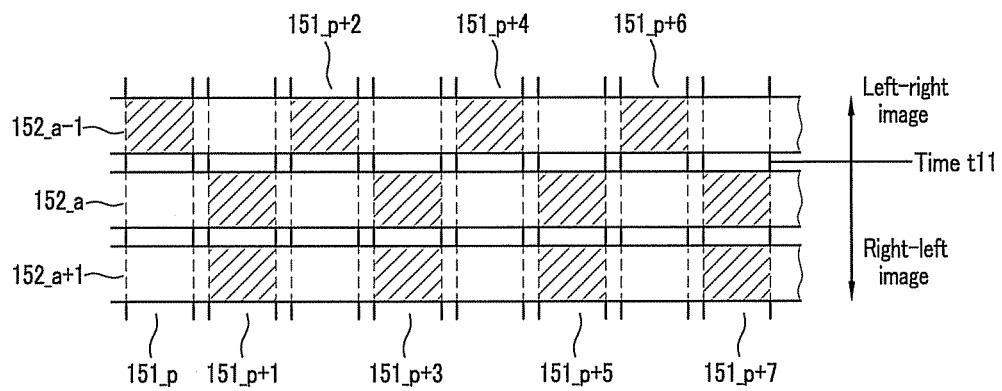
FIG. 9A, FIG. 9B, and FIG. 9C are diagrams representing variations of the barrier unit at respective times t11, t12, and t13.
Figure 9B:
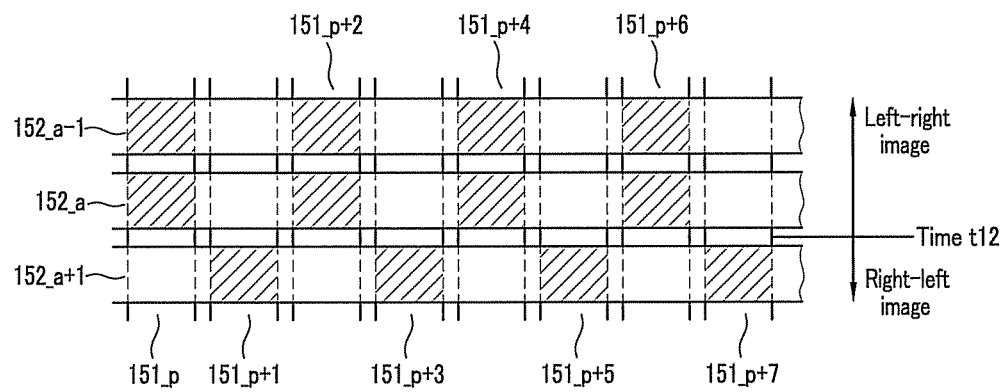
Figure 9C:
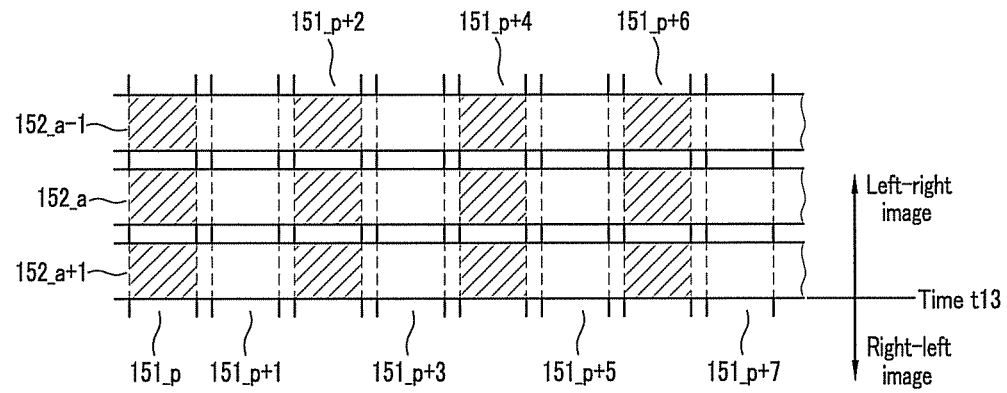

FIG. 9A, FIG. 9B, and FIG. 9C are diagrams representing variations of the barrier unit 150 at the respective times t11, t12, and t13 of the write period T11 of the first period T1 of the single frame (1 Frame) as shown in FIGS. 6 and 8.

As shown in FIG. 9A, the crossing regions of the row barrier electrode 152_*a*−1 and the first column barrier electrode group 151_*p*, 151_*p*+2, 151_*p*+4, and 151_*p*+6 are driven in the first barrier mode B1 as the non-transmission regions at the time t11 to display the left-right image LR. However, the crossing regions of the row barrier electrodes 152_*a* to 152_*m* (not shown), positioned below the row barrier electrode 152_*a*−1, and the second column barrier electrode group 151_*p*+1, 151_*p*+3, 151_*p*+5, and 151_*p*+7 are driven in the second barrier mode B2 as the non-transmission regions to display the right-left image RL.

In FIG. 9B, the crossing regions of the row barrier electrode 152_*a* and the first column barrier electrode group 151_*p*, 151_*p*+2, 151_*p*+4, and 151_*p*+6 are driven in the first barrier mode B1 as the non-transmission regions at the time t12 to display the left-right image LR along with the crossing regions of the row barrier electrode 152_*a*−1 and the first column barrier electrode group 151_*p*, 151_*p*+2, 151_*p*+4, and 151_*p*+6. However, the crossing regions of the row barrier electrodes 152_*a*+1 to 152_*m* (not shown) and the second column barrier electrode group 151_*p*+1, 151_*p*+3, 151_*p*+5, and 151_*p*+7 are driven in the second barrier mode B2 as the non transmission regions to continue to display the right-left image RL.

In FIG. 9C, the crossing regions of the row barrier electrode 152_*a*+1 and the first column barrier electrode group 151_*p*, 151_*p*+2, 151_*p*+4, and 151_*p*+6 become the non-transmission regions at the time t13 and display the left-right image LR along with the crossing regions of the row barrier electrodes 152_*a*−1 and 152_*a* and the first column barrier electrode group 151_*p*, 151_*p*+2, 151_*p*+4, and 151_*p*+6. However, the crossing regions of the row barrier electrodes 152_*a*+2 to 152_*m* (not shown) and the second column barrier electrode group 151_*p*+1, 151_*p*+3, 151_*p*+5, and 151_*p*+7 are driven in the second barrier mode B2 as the non-transmission regions to continue to display the right-left image RL.

In this way, since the non-transmission regions are changed in synchronization with the time at which the selection signal is applied to the scan line, the stereoscopic image is separately projected to the left eye and the right eye when the images are written from the right-left image RL to the left-right image LR. Thereby, screens of the right-left image and the left-right image are not mixed and image quality is improved. A method for writing images from the left-right image LR to right-left image RL by the electronic display device according to the exemplary embodiment of the present invention is the same as the method for writing images from the right-left image RL to the left-right image LR.

Figure 10:
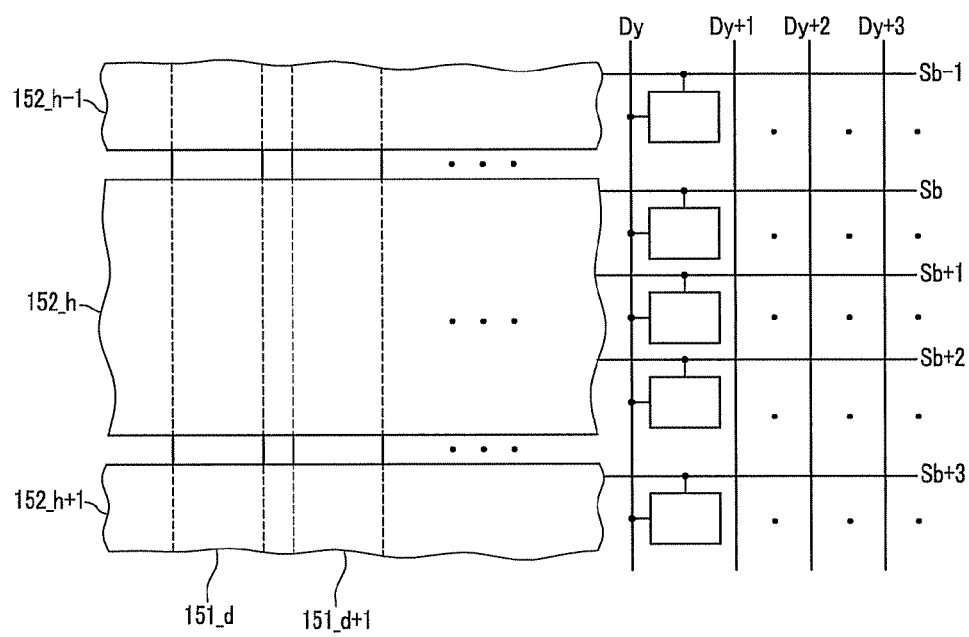
FIG. 10 is a diagram of a barrier unit according to a second exemplary embodiment of the present invention.

FIG. 10 is a diagram of a barrier unit according to a second exemplary embodiment of the present invention. In the barrier unit, one row barrier electrode corresponds to more than two scan lines. In FIG. 10, for example, three scan lines correspond to one barrier electrode, but aspects of the present invention are not limited thereto. In this case, the number of row barrier electrodes is less than the number of the plurality of scan lines, but aspects of the present invention are not limited thereto. The column barrier electrode 151_*d* is one of the first column barrier electrode group, and the column barrier electrode 151_*d*+1 is one of the second column barrier electrode group.

As shown in FIG. 10, one row barrier electrode 152_*h* corresponds to three scan lines Sb, Sb+1, and Sb+2. In this case, a time for applying the barrier scan signal BSh to the row barrier electrode 152_*h* may be established in various manners. For example, the barrier scan signal BSh may be applied in synchronization with a time for first applying the selection signal to the plurality of scan lines Sb, Sb+1, and Sb+2 corresponding to the row barrier electrode to write the data signal to the pixel. In addition, the barrier scan signal BSh may be applied according to one of the second and third selection signals Sb+1, and Sb+2. Further, the barrier scan signal BSh may be applied during a predetermined period for applying the first to third selection signals to all of the scan lines Sb, Sb+1, and Sb+2.

Figure 11:
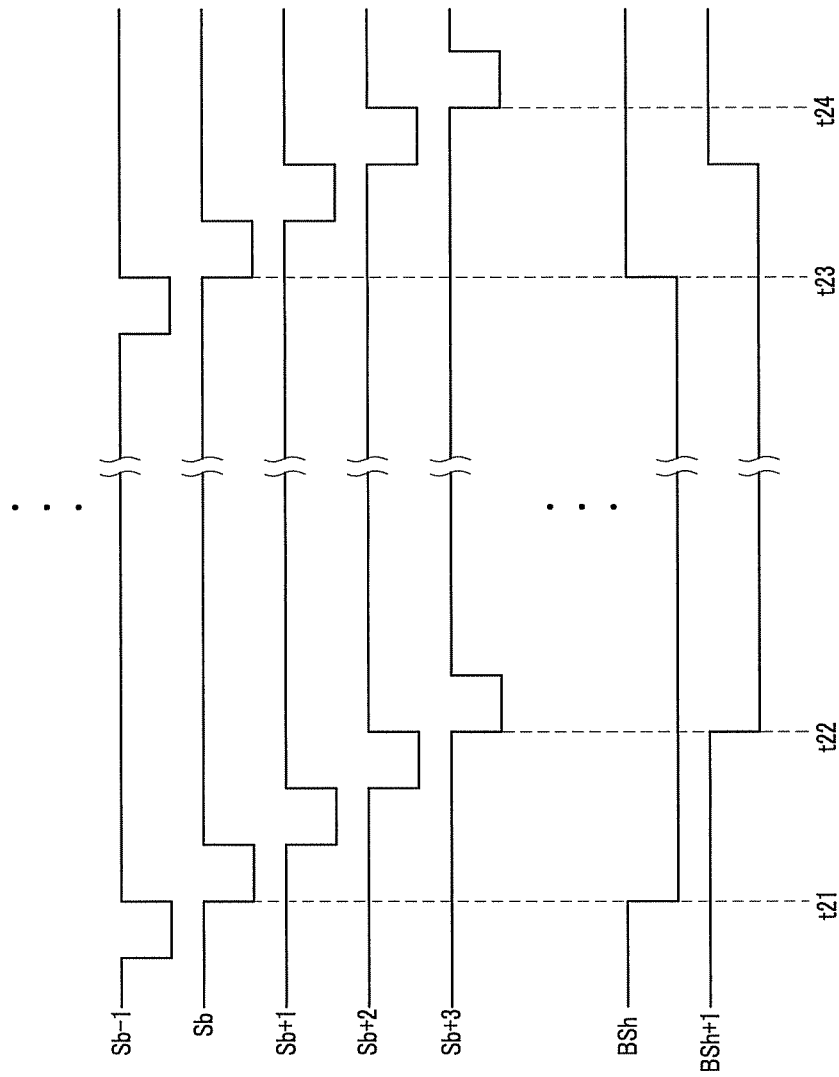
FIG. 11 is a timing diagram representing the barrier scan signals applied in synchronization with a time for first applying the selection signal to the plurality of scan lines corresponding to the row barrier electrode in the electronic display device according to the second exemplary embodiment of the present invention.

FIG. 11 is a timing diagram representing the barrier scan signals applied in synchronization with a time for first applying the selection signal to the plurality of scan lines corresponding to the row barrier electrode in the electronic display device according to the second exemplary embodiment of the present invention. Reference is also made to FIG.10 in which row barrier scan electrode 152_*h* corresponds to the scan lines Sb, Sb+1, and Sb+2.

As shown in FIG. 11, the level of the barrier scan signal BSh is changed from the high level to the low level at the time t21 for applying the selection signal of the low level to the scan line Sb. Thereby, since the voltage of 5V is applied to the first column barrier electrode group, the crossing regions of the row barrier scan electrode 152_h and the first column barrier electrode group become the non-transmission regions. The level of the barrier scan signal BSh+1 is changed from the high level to the low level at the time for applying the selection signal of the low level to the scan line Sb+3. Thereby, since the voltage of 5V is applied to the first column barrier electrode group, the crossing regions of the row barrier scan electrode 152_h+1 and the first column barrier electrode become the non-transmission regions.

When the write period T21 of the right-left image RL is started after the sustain period T12 of the left-right image LR of the first period T1 is finished, the selection signal of the low level is applied to the scan line Sb at the time t23, and the level of the barrier scan signal BSh is changed from the low level to the high level. Thereby, since the voltage of 0V is applied to the second column barrier electrode group, the crossing regions of the row barrier scan electrode 152_h and the second column barrier electrode group become the non-transmission regions. The selection signal of the low level is applied to the scan line Sb+3 at the time t24, and the level of the barrier scan signal BSh+1 is changed from the low level to the high level. Thereby, since the voltage of 0V is applied to the second column barrier electrode group, the crossing regions of the row barrier scan electrode 152_h+1 and the second column barrier electrode group become the non-transmission regions.

Figure 12:
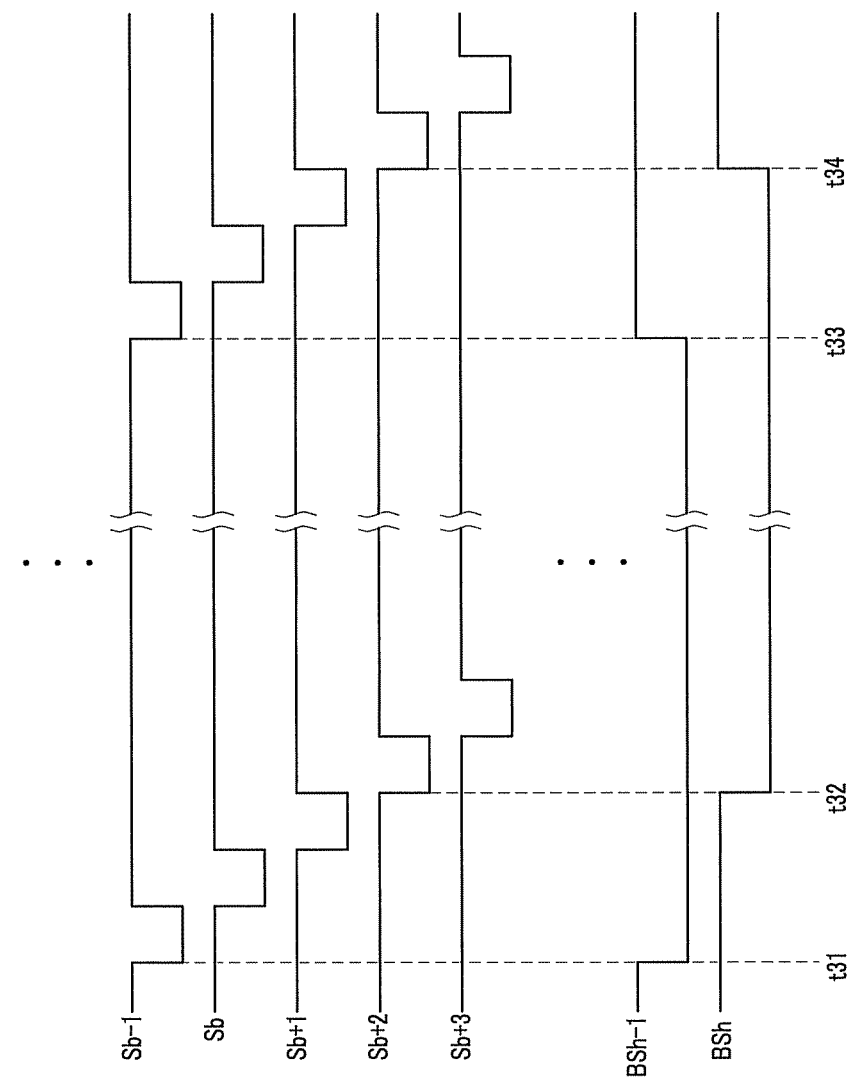
FIG. 12 is a timing diagram representing the barrier scan signals applied in synchronization with a time for lastly applying the selection signal to the plurality of scan lines corresponding to the row barrier electrode in the electronic display device according to the second exemplary embodiment of the present invention.

FIG. 12 is a timing diagram representing the barrier scan signals applied in synchronization with a time for lastly applying the selection signal to the plurality of scan lines corresponding to the row barrier electrode in the electronic display device according to the second exemplary embodiment of the present invention. Reference is also made to FIG. 10 in which row barrier scan electrode 152_h corresponds to the scan lines Sb, Sb+1, and Sb+2.

As shown in FIG. 12, the level of the barrier scan signal BSh−1 is changed from the high level to the low level at the time t31 for applying the selection signal of the low level to the scan line Sb−1. Thereby, since the voltage of 5V is applied to the first column barrier electrode group, the crossing regions of the row barrier scan electrode 152_h−1 and the first column barrier electrode group become the non-transmission regions. The level of the barrier scan signal BSh is changed from the high level to the low level at the time t32 for applying the selection signal of the low level to the scan line Sb+2. Thereby, since the voltage of 5V is applied to the first column barrier electrode group, the crossing regions of the row barrier scan electrode 152_h and the first column barrier electrode become the non-transmission regions.

When the write period T21 of the right-left image RL is started after the sustain period T12 of the left-right image LR is finished, the selection signal of the low level is applied to the scan line Sb−1 at the time t33, and the level of the barrier scan signal BSh−1 is changed from the low level to the high level. Thereby, since the voltage of 0V is applied to the second column barrier electrode, the crossing regions of the row barrier scan electrode 152_h−1 and the second column barrier electrode group become the non-transmission regions. The selection signal of the low level is applied to the scan line Sb+2 at the time t34, and the level of the barrier scan signal BSh is changed from the low level to the high level. Thereby, since the voltage of 0V is applied to the second column barrier electrode group, the crossing regions of the row barrier scan electrode 152_h and the second column barrier electrode group become the non-transmission regions. It has been described in the second exemplary embodiment of the present invention that the voltage level of the barrier scan signal is changed in synchronization with a time for starting a period for applying the last selection signal corresponding to the row barrier electrode. However, the voltage level may be changed in synchronization with a time for finishing a period for applying the last selection signal. In further detail, in FIG. 12, the level of the barrier scan signal BSh−1 may be changed from the high level to the low level in synchronization with a time where the level of the selection signal Sb−1 is changed from the low level to the high level.

As described, the non-transmission region of the barrier unit may be changed by changing the voltage level applied to the barrier electrode in synchronization with the selection signal.

The barrier unit is changed at the time t21 to be appropriate for the left-right image LR when the non-transmission region of the barrier unit is changed according to the timings shown in FIG. 11. However, since the pixel connected to the scan lines Sb+1 and Sb+2 displays the right-left image, the image quality may be deteriorated. In this case, when a user may not perceive a time for applying the selection signal to the scan line Sb+2 and changing the image from the right-left image RL to the left-right image LR since the time is short, the deterioration of the image quality may be negligible.

In a like manner, when the non-transmission region of the barrier unit is changed according to the timings shown in FIG. 12, the left-right image LR is written on the barrier unit at the time t31, but the barrier unit is driven in the second mode B2 that is appropriate for the right-left image RL, and therefore image quality may be deteriorated. In this case, when the user does not perceive a period between a time applying the selection signal to the scan line Sb and a time for changing the level of the barrier scan signal BSh, since the period is short, the deterioration of the image quality may be negligible. That is, the number of scan lines corresponding to one row barrier electrode is required to be established within a range in which the deterioration of the image quality perceived by the user is negligible.

To increase the number of scan lines corresponding to a row barrier electrode so as to reduce the deterioration of the image quality perceived by the user, the barrier unit to which the selection signal is applied may be blanked during a period between a time for first applying the selection signal to the plurality of scan lines corresponding to the row barrier electrode and a time for applying the last selection signal. In further detail, the barrier scan signal of a predetermined level is applied to the row barrier electrode so that the entire row barrier electrode becomes the non-transmission region, which will be referred to as a "blank area". In this case, when a voltage of the crossing regions of the column barrier electrodes and the row barrier electrodes of the barrier unit is lower than the threshold voltage, the barrier unit may be a default black mode barrier unit such that the crossing regions having a voltage difference lower than the threshold voltage are the non-transmission regions.

Figure 13:
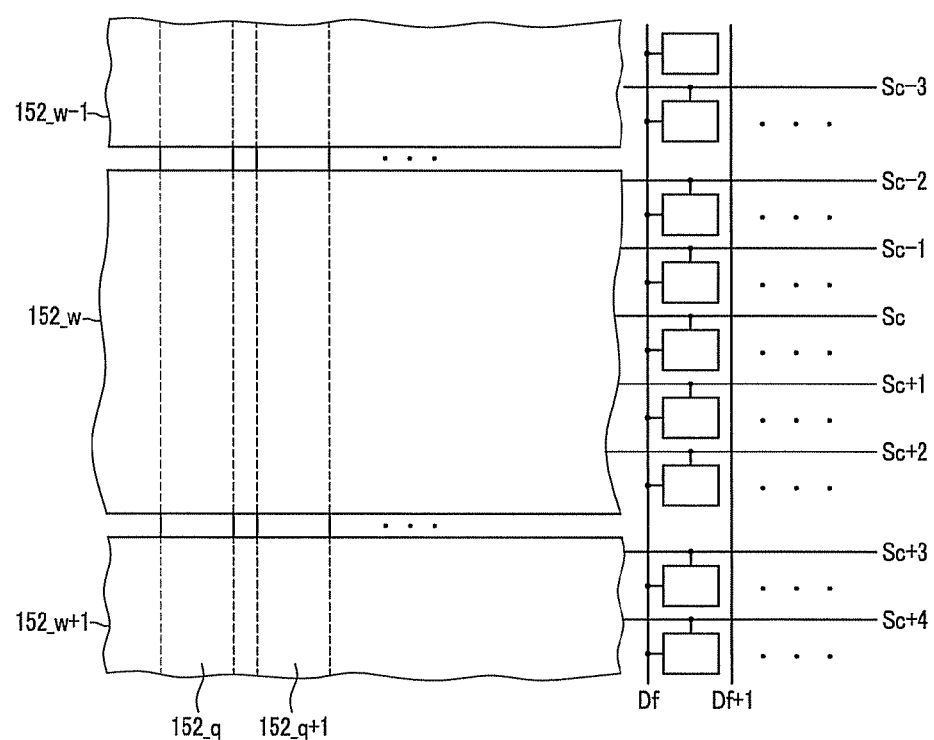
FIG. 13 is a diagram of an electronic display device according to a third exemplary embodiment of the present invention.

FIG. 13 is a diagram of an electronic display device according to a third exemplary embodiment of the present invention. One row barrier electrode 152_w corresponds to five scan lines Sc−2, Sc−1, Sc, Sc+1, and Sc+2. In FIG. 13, for better understanding and ease of description, two column barrier electrodes 152_q and 152_q+1 and some of the plurality of row barrier electrodes of the barrier unit are shown. In further detail, three row barrier electrodes 152_w−1, 152_w, and 152 w+1, eight scan lines Sc−3, Sc−2, Sc−1, Sc, Sc+1, Sc+2, Sc+3, and Sc+4, two data lines Df and Df+1, and a plurality of pixels at crossing regions of the scan and data lines are shown.

The column barrier electrode 152_*q* is one of the second column barrier electrode group, and the column barrier electrode 152_*q*+1 is one of the first column barrier electrode group.

Figure 14:
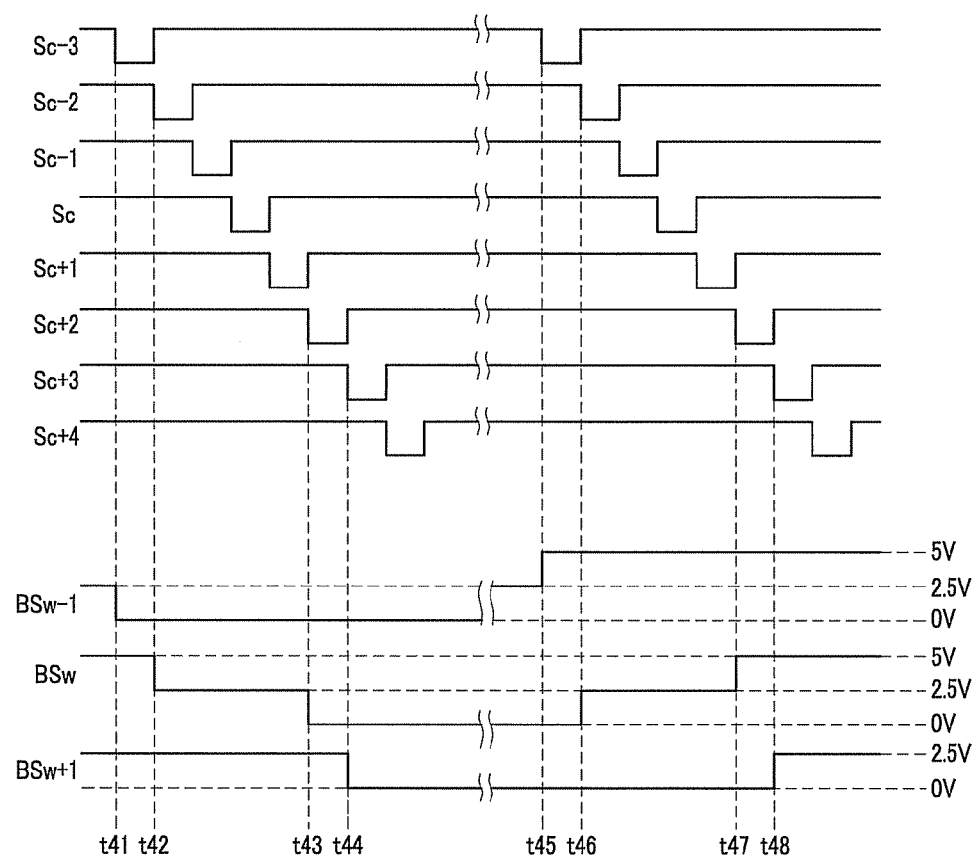
FIG. 14 is a diagram representing the selection signal and the barrier scan signal applied to the electronic display device according to the third exemplary embodiment of the present invention.

FIG. 14 is a diagram representing the selection signal and the barrier scan signal applied to the electronic display device according to the third exemplary embodiment of the present invention. Since the barrier unit of the electronic display device according to the third exemplary embodiment of the present invention is the default black mode, the barrier unit on which the row barrier electrode is positioned is blanked while the selection signal is transmitted to the plurality of scan lines corresponding to the row barrier electrode. The threshold voltage is established to be 5V, and the voltages of 0V and 5V are respectively applied to the first column barrier electrode 152_*q* and the second column barrier electrode 152_*q*+1. When the barrier scan signal is within a range between 0V and 5V, since the voltage difference between the first column barrier electrode 152_*q* and the row barrier electrode and the voltage difference between the second column barrier electrode 152_*q*+1 and the row barrier electrode are not greater than the threshold voltage, the barrier unit on which the row barrier electrode is positioned is blanked. The barrier scan signal according to the third exemplary embodiment of the present invention has levels of 0V, 2.5V, and 5V. In the third exemplary embodiment of the present invention, the level of 2.5V allows the voltage difference between the row barrier electrode and the first and second column barrier electrodes 152_*q* and 152_*q*+1 to not be greater than the threshold voltage; however, aspects of the present invention are not limited thereto.

Specifically, when the selection signal is applied to the scan line Sc−3 at the time t41, the selection signal is applied to all of the scan lines (not shown) corresponding to the row barrier electrode 152_*w*−1. Thereby, since the pixel emits light according to the data signal, the level of the barrier scan signal BSw−1 is changed from 2.5V to 0V in synchronization with the time t41. Since the voltage difference between the row barrier electrode 152_*w*−1 and the second column barrier electrode group (represented by 152_*q*) is greater than the voltage difference, the crossing regions of the row barrier electrode 152_*w*−1 and the second column barrier electrode group become the transmission regions. Thereby, the barrier unit on which the row barrier electrode 152_*w*−1 is positioned is driven in the first barrier mode B1. When the selection signal is applied to the scan line Sc−2 at the time t42, the level of the barrier scan signal BSw applied to the row barrier electrode 152_*w* is changed from 5V to 2.5V. Thereby, since the voltage differences between the row barrier electrode 152_*w* and the first and second column barrier electrode groups (represented by 152_*q* and 152_*q*+1, respectively) are respectively less than the threshold voltage, the barrier unit on which the row barrier electrode 152_*w* is positioned is blanked. When the selection signal is applied to the scan line Sc+2 at the time t43, the selection signal is applied to the scan lines corresponding to the row barrier electrode 152_*w*, the pixel emits light according to the data signal, and the level of the barrier scan signal BSw is changed from 2.5V to 0V at the time t43. Thereby, since the voltage difference between the row barrier electrode 152_*w* and the second column barrier electrode group (represented by 152_*q*+1) is greater than the threshold voltage, the crossing regions of the row barrier electrode 152_*w* and the second column barrier electrode group becomes the transmission regions. Accordingly, the barrier unit on which the row barrier electrode 152_*w* is positioned is driven in the first barrier mode B1. The barrier unit on which the row barrier electrode 152_*w*+1 is positioned is driven in the first barrier mode B1 at the time t44. In this process, the period T11 for writing the left-right image LR1 is finished, and the left-right image is maintained during the sustain period T12.

During the period T21 for writing the right-left image RL1, when the selection signal is applied to the scan line Sc−2 at the time t46, the level of the barrier scan signal BSw applied to the row barrier electrode 152_*w* is changed from 0V to 2.5V. Thereby, since the voltage differences between the row barrier electrode 152_*w* and the first and second column barrier electrode groups (represented by 152_*q* and 152_*q*+1, respectively) are respectively less than the threshold voltage, the barrier unit 150 on which the row barrier electrode 152_*w* is positioned is blanked. When the selection signal is applied to the scan line Sc+2 at the time t47, the selection signal is applied to the all of the scan lines Sc−2, Sc−1, Sc, Sc+1, and Sc+2, corresponding to the row barrier electrode 152_*w*, the pixel emits light according to the data signal, and therefore the level of the barrier scan signal BSw is changed from 2.5V to 5V in synchronization with the time t47. Thereby, the voltage difference between the row barrier electrode 152_*w* and the first column barrier electrode group is greater than the threshold voltage, and the crossing regions of the row barrier electrode 152_*w* and the first column barrier electrode group becomes the transmission region. The barrier unit on which the row barrier electrode 152_*w* is positioned is driven in the second barrier mode B2. In a like manner, the barrier unit on which the row barrier electrode 152_*w*−1 is positioned is driven in the second barrier mode B2 from the time t45. The barrier unit on which the row barrier electrode 152_*w*+1 is positioned is blanked at the time t48. It has been described in the third exemplary embodiment of the present invention that the voltage level of the barrier scan signal is changed in synchronization with a time for starting a period for applying the last selection signal of an area on which the row barrier electrode is positioned, but aspects of the present invention are not limited thereto such that the voltage level of the barrier scan signal may be changed in synchronization with a time for finishing the period for applying the last selection signal. In further detail, the level of the barrier scan signal BSw may be changed to be the voltage of 0V in synchronization with a time where the selection signal Sc+2 is changed from the low level to the high level. Moreover, the blanking of the row barrier electrodes may occur in synchronization with any one of the selection signals applied to the scan lines of the display device.

Accordingly, the image quality deterioration generated when the left-right image of the display unit on which the plurality of scan lines corresponding to the row barrier electrode is changed to the right-left image or the right-left image is changed to the left-right image is reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An electronic display device to display a stereoscopic image, comprising:
   a display unit comprising a plurality of scan lines to transmit a plurality of selection signals to a plurality of pixels, a plurality of data lines to transmit a plurality of data signals to the plurality of pixels, the plurality of data signals formed according to input signals; and a barrier unit comprising:
- a plurality of first column barrier electrodes interposed with a plurality of second column barrier electrodes, the pluralities of the first and second column barrier electrodes respectively corresponding to the plurality of data lines,
- a plurality of row barrier electrodes, each of the plurality of row barrier electrodes corresponding to at least one of the plurality of scan lines, and
- a barrier driver that applies a barrier scan signal of a first level to one of the plurality of row barrier electrodes in synchronization with a selection signal applied to one of at least two scan lines of the plurality of scan lines, wherein:
  - first crossing regions in which the plurality of the first column barrier electrodes and the plurality of row barrier electrodes cross and second crossing regions in which the plurality of the second column barrier electrodes and the plurality of row barrier electrodes cross transmit light emitted from the display unit differently along each of the plurality of row barrier electrodes, and
  - the barrier driver applies the barrier scan signal of the first level to the one of the plurality of row barrier electrodes:
    - in synchronization with a time when the selection signal is first applied to the at least two scan lines,
    - in synchronization with a time when the selection signal is finally applied to the at least two scan lines, or
    - at a predetermined time between the time at which the selection signal is first applied to the at least two scan lines and the time at which the selection signal is finally applied to the at least two scan lines.

2. The electronic display device of claim 1, wherein the pluralities of the first and second column barrier electrodes are respectively formed parallel to the plurality of data lines, and the plurality of row barrier electrodes are respectively formed parallel to the plurality of scan lines.

3. The electronic display device of claim 1, wherein a voltage applied to the plurality of first column barrier electrodes is different from a voltage applied to the plurality of second column barrier electrodes.

4. The electronic display device of claim 3, wherein the barrier scan signal having the first level is applied to one of the plurality of row barrier electrodes corresponding to a first scan line of the plurality of scan lines in synchronization with a time when the selection signal is applied to the first scan line.

5. The electronic display device of claim 1, wherein:
- the barrier driver applies the barrier scan signal in synchronization with a time the selection signal is applied to the one of the at least two scan lines of the plurality of scan lines, and
- the plurality of row barrier electrodes respectively correspond to the plurality of scan lines.

6. An electronic display device to display a stereoscopic image, comprising:
- a display unit comprising a plurality of scan lines to transmit a plurality of selection signals to a plurality of pixels, a plurality of data lines to transmit a plurality of data signals to the plurality of pixels, the plurality of data signals formed according to input signals; and
- a barrier unit comprising:
  - a plurality of first column barrier electrodes interposed with a plurality of second column barrier electrodes, the pluralities of the first and second column barrier electrodes respectively corresponding to the plurality of data lines,
  - a plurality of row barrier electrodes, each of the plurality of row barrier electrodes corresponding to at least one of the plurality of scan lines, and
  - a barrier driver that applies a barrier scan signal of a first level to one of the plurality of row barrier electrodes in synchronization with a selection signal applied to one of at least two scan lines of the plurality of scan lines, wherein:
    - first crossing regions in which the plurality of the first column barrier electrodes and the plurality of row barrier electrodes cross and second crossing regions in which the plurality of the second column barrier electrodes and the plurality of row barrier electrodes cross transmit light emitted from the display unit differently along each of the plurality of row barrier electrodes,
    - a voltage of the first level is applied to the plurality of first column barrier electrodes and a voltage of a second level is applied to the plurality of second column barrier electrodes, the first and second crossing regions respectively becoming transmission regions when voltage differences between the first column barrier electrodes and the corresponding row barrier electrode and between the second column barrier electrodes and the corresponding row barrier electrode are greater than a predetermined threshold voltage, and
    - the barrier driver applies a voltage of a third level to the corresponding row barrier electrode from a time at which the selection signal is first applied to the at least two scan lines until a time at which the selection signal is finally applied to the at least two scan lines.

7. The electronic display device of claim 1, wherein the barrier driver applies the barrier scan signal of the first level to the one of the plurality of row barrier electrodes in synchronization with the time when the selection signal is first applied to the at least two scan lines.

8. The electronic display device of claim 1, wherein the barrier driver applies the barrier scan signal of the first level to the one of the plurality of row barrier electrodes in synchronization with the time when the selection signal is finally applied to the at least two scan lines.

9. The electronic display device of claim 1, wherein the barrier driver applies the barrier scan signal of the first level to the one of the plurality of row barrier electrodes at the predetermined time between the time at which the selection signal is first applied to the at least two scan lines and the time at which the selection signal is finally applied to the at least two scan lines.

10. The electronic display device of claim 6, wherein:
- the barrier driver applies the barrier scan signal to the one of the plurality of row barrier electrodes in synchronization with a time when the selection signal is applied to the one of the at least two scan lines of the plurality of scan lines, and
- plurality of row barrier electrodes respectively correspond to at least the two scan lines of the plurality of scan lines.

11. The electronic display device of claim 6, wherein the voltage difference between the first level and the third level and a voltage difference between the second level and the third level are less than the predetermined threshold voltage.

12. The electronic display device of claim 1, wherein the input signal includes first image information corresponding to a first viewing point and second image information corresponding to a second viewing point, and the electronic display device generates first image data and second image data according to the first image information and the second image information.

13. The electronic display device of claim 12, wherein the barrier driver sequentially applies a plurality of barrier scan signals respectively having the first level to the plurality of row barrier electrodes in synchronization with selection signals sequentially applied to the plurality of scan lines during a first period to display the first image data on the display unit.

14. The electronic display device of claim 13, wherein the barrier driver sequentially changes levels of the plurality of barrier scan signals respectively applied to the plurality of row barrier electrodes to a second level in synchronization with the selection signals sequentially applied to the plurality of scan lines during a second period to display the second image data on the display unit after the first period.

15. The electronic display device of claim 14, wherein the first image information comprises left-eye image information, the second image information comprises right-eye image information, the first image data is generated by alternately combining first portions of the first image information with second portions the second image information, and the second image data is generated by alternately combining the first portions of the second image information with second portions of the first image information.

16. The electronic display device of claim 14, wherein voltages of third and fourth levels are respectively applied to the first and second column barrier electrodes.

17. The electronic display device of claim 16, wherein a voltage difference between the first and third levels is greater than a predetermined threshold voltage, and a voltage difference between the second and fourth levels is greater than the predetermined threshold voltage.

18. The electronic display device of claim 17, wherein the first and second periods together display one frame of the stereoscopic image.

19. A barrier device, comprising:
a barrier unit, comprising
a plurality of first barrier electrodes formed in a column direction, the plurality of first barrier electrodes being divided as first column barrier electrodes to which a voltage of a first level is applied and second column barrier electrodes to which a voltage of a second level is applied
a plurality of second barrier electrodes formed in a row direction, and
a barrier driver that sequentially applies a plurality of barrier scan signals alternately having voltages of third and fourth levels to the plurality of second barrier electrodes, wherein;
the plurality of second barrier electrodes respectively cross one of the plurality of first barrier electrodes, the plurality of first barrier electrodes respectively cross one of the plurality of second barrier electrodes,
an area in which a voltage difference between the first barrier electrode and the second barrier electrode is greater than a predetermined threshold voltage has a transmission state that is different from an area in which a voltage difference between the first barrier electrode and the second barrier electrode is less than the predetermined threshold voltage, and
a voltage difference between the voltage of the third level and the voltage of the first level is greater than the predetermined threshold voltage, and a voltage difference between the voltage of the second level and the voltage of the fourth level is greater than the predetermined threshold voltage.

20. The barrier device of claim 19, wherein the first column barrier electrodes and the second column barrier electrodes are alternately formed.

* * * * *